(12) United States Patent
Kim

(10) Patent No.: US 12,332,447 B2
(45) Date of Patent: Jun. 17, 2025

(54) DISPLAY MODULE CAPABLE OF POSITIONING IMAGE AND OPTICAL DEVICE COMPRISING THE SAME

(71) Applicant: Epic Avionics Co., Ltd., Yongin-si (KR)

(72) Inventor: Dong Ha Kim, Gangneung-si (KR)

(73) Assignee: Epic Avionics Co., Ltd., Yongin-si (KR)

( * ) Notice: Subject to any disclaimer, the term of this patent is extended or adjusted under 35 U.S.C. 154(b) by 629 days.

(21) Appl. No.: 17/743,500

(22) Filed: May 13, 2022

(65) Prior Publication Data
US 2022/0382058 A1 Dec. 1, 2022

(30) Foreign Application Priority Data
May 27, 2021 (KR) .......................... 10-2021-0067988

(51) Int. Cl.
 *G02B 27/01* (2006.01)
(52) U.S. Cl.
 CPC ..... *G02B 27/0172* (2013.01); *G02B 27/0179* (2013.01); *G02B 2027/011* (2013.01); *G02B 2027/0187* (2013.01)
(58) Field of Classification Search
 None
 See application file for complete search history.

(56) References Cited

U.S. PATENT DOCUMENTS 9,869,861 B2 * 1/2018 Takashima ......... G02B 27/0172
2015/0261015 A1 9/2015 Han et al.

FOREIGN PATENT DOCUMENTS

| KR | 10-2015-0020801 A | 2/2015 |
| KR | 10-2015-0024580 A | 3/2015 |
| KR | 10-2015-0026486 A | 3/2015 |
| KR | 10-2016-0146814 A | 12/2016 |
| KR | 10-2017-0030594 A | 3/2017 |
| KR | 10-2019-0039658 A | 4/2019 |

* cited by examiner

Primary Examiner — Thanh Nhan P Nguyen
(74) Attorney, Agent, or Firm — Revolution IP, PLLC

(57) ABSTRACT

Disclosed is a display module including an output unit configured to form an image to output the image forward, a lens unit configured to have a virtual central axis in front of the output unit and transmit the image so that an optical axis of the image transmitted from the output unit is parallel with the central axis to transmit the image forward, and a guide unit formed to be elongated to have at least a pair of total reflection surfaces facing each other and of which the image transmitted through the lens unit is incident on one side to move to the other side through total internal reflection at least one or more times and the image is reflected on the other side through a separate exit surface to be provided to the user's field of view.

10 Claims, 3 Drawing Sheets

DISPLAY MODULE CAPABLE OF POSITIONING IMAGE AND OPTICAL DEVICE COMPRISING THE SAME

TECHNICAL FIELD

The present invention relates to a display module capable of positioning an image and an optical device comprising the same, and more particularly, to a display module capable of positioning an image so as to minimize the disturbance of a field of view by implementing the image at a position spaced apart from a user's central field of view at a predetermined angle.

BACKGROUND ART

Recently, many technologies for virtual reality or augmented reality have been developed, and display modules that can be directly worn and used by users in form of goggles are already being commercialized.

Among these devices, the augmented reality is currently in the spotlight, and the augmented reality refers to a technology that looks as if a virtual object exists together in reality by placing a virtual image on a real environment we see.

In general, since such an augmented reality device is worn directly on the head by the user and provided so that a lens is disposed in front of a field of view, reduction in weight or size is very important.

Recently, as a display module for outputting an image in such an augmented reality device or an optical device, a DLP, a liquid crystal display device, or the like has been widely used.

However, when using the liquid crystal display (LCD), the DLP, or the like, illumination light is necessarily used, and at that time, various types of lenses, mirrors, or prisms are provided to transmit the illumination light at an appropriate angle to adjust a movement path of the image and to be implemented in a user's central field of view.

However, in this way, since the image located in the user's central field of view obstructs an actual field of view, for convenience, it is necessary to implement the image at a position deflected from the user's central field of view at a predetermined angle.

However, only by simply disposing the position of the image in a deflected manner, the degradation of resolution or distortion of the implemented image occurs, and a problem of aberration occurs, and thus, there was a problem that it is difficult to implement the image correctly.

Therefore, it is necessary to develop a technique for disposing an image so as to be deflected from the user's central field of view while solving this problem.

DISCLOSURE

Technical Problem

An object of the present invention is to solve the problems of conventional display modules, and more particularly, to provide a display module and an optical device including the same capable of stably positioning an image by implementing the image at a position shifted from a central field of view of a user at a predetermined angle when outputting the image and correcting the distortion occurring the shifted position.

Technical Solution

According to an aspect of the present invention, there is provided a display module including an output unit configured to form an image to output the image forward, a lens unit configured to have a virtual central axis in front of the output unit and transmit the image so that an optical axis of the image transmitted from the output unit is parallel with the central axis to transmit the image forward, and a guide unit formed to be elongated to have at least a pair of total reflection surfaces facing each other and of which the image transmitted through the lens unit is incident on one side to move to the other side through total internal reflection at least one or more times and the image is reflected on the other side through a separate exit surface to be provided to the user's field of view, wherein the image output from the output unit is provided to deviate from the user's central field of view by a predetermined angle and the lens unit is tilted at a predetermined angle so that the image intersects the central axis in response to the angle deviating from the user's central field of view to correct the distortion.

In the lens unit, a plurality of lenses may be disposed along a virtual central axis, and at least some of the lenses may be adjusted to intersect the optical axis.

The lens unit may be disposed to be tilted by an angle of $\theta\_L$ with respect to the central axis within the range of $|\theta\_I-\theta\_L| \leq 5°$ to correct the distortion of the image deviating from the user's central field of view by an angle of $\theta\_I$.

The output unit may output the image so that the optical axis of the image is located at a position parallel to the central axis and deflected to one side.

The guide unit may be provided in a state in which the image moved inside is out of the user's central field of view by adjusting a reflection angle to a predetermined angle from the exit surface.

The output unit may selectively reflect at least a part of the incident illumination light and form an image and transmit the image forward.

The output unit may form the image in a rectangular shape and have a long side disposed in a vertical direction.

The image may be disposed at a position within 5° to 30° along a lateral direction with respect to the user's central field of view.

According to another aspect of the present invention, there is provided an optical device including a wearing module that is wearable on a user's head and is at least partially disposed in front of a user's field of view, a display module provided in the wearing module and including the aforementioned configuration, and a control module connected to the display module to selectively adjust the output of the image or to control the size and position of the image.

The optical device may further include a photographing module which is provided in the wearing module to be disposed toward the front to photograph a range of the user's field of view and selectively photographs a video or image to record the video or image and transmit the video or image to the control module.

Advantageous Effects

In order to solve the above problems, the present invention has the following effects.

First, according to the present invention, the display module is configured so that the image is disposed in an area of about 5° to 30° to allow the user's eye movement to be comfortable while departing from a user's central field of view and corrects the distortion even if the position of the image is shifted through the tilting of the lens unit, so that it is possible to correctly transmit the image.

Second, according to the present invention, the output unit 210 forms the image I in a longitudinal rectangular shape and positions the image in an area of about 5° to 30° based on the central field of view, so that it is possible to utilize the widest possible area within a limited area.

The effects of the present invention are not limited to the aforementioned effect, and other effects, which are not mentioned above, will be apparent to those skilled in the art from the description of the appended claims.

BEST MODE

Figure 1:
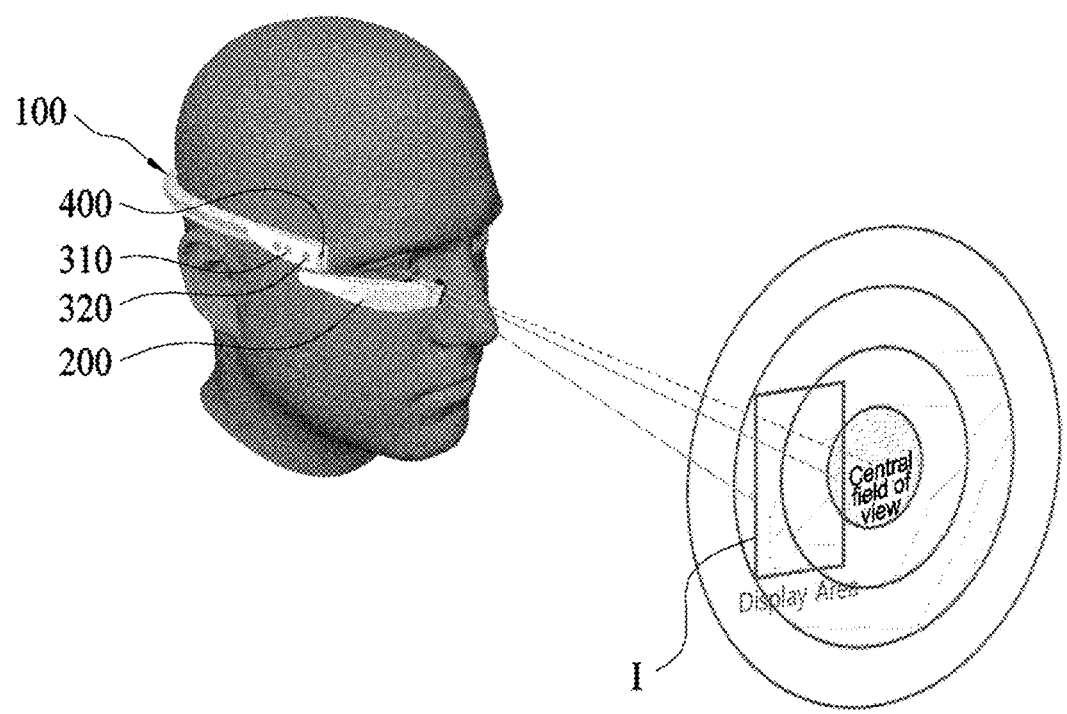
FIG. 1 is a diagram illustrating a configuration of an optical device and the arrangement of an output image according to the present invention.
Figure 2:
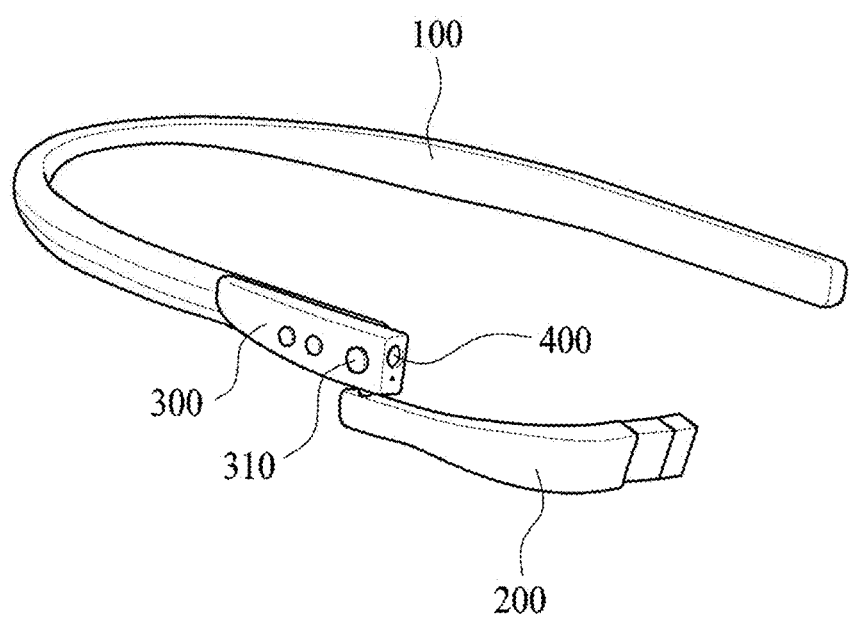
FIG. 2 is a diagram illustrating a detailed configuration of the optical device of FIG. 1.

A preferred embodiment of a display module capable of positioning an image according to the present invention configured as described above will be described with reference to the accompanying drawings. However, the embodiment is not intended to limit the present invention to a specific form, but to help in a clearer understanding of the present invention.

In describing the embodiment, like names and like reference numerals are used with respect to like components and the resulting additional description will be omitted.

First, a configuration of a display module capable of positioning an image according to the present invention will be described below with reference to the illustrated drawings.

The present invention relates to a display module 200 that is worn on a user's head to project an image I in front of a field of view and an optical device using the same, and the optical device according to the present invention largely includes a wearing module 100, a display module 200, a control module 400, and a photographing module 400.

The wearing module 100 is configured to wear the entire optical device including the above-described module on a user's body, and is formed in a curved band shape or ring shape to be wearable on the user's head. In addition, at least a part is disposed in front of the user's field of view so that the image I output by the display module 200 may be transmitted.

Specifically, the wearing module 100 is formed in the form of a general headset or headband, and configured to be worn by the user with a lens formed in the front, and at this time, the lens formed in the front is made of a transmissive material and at the same time, configured so that the image I transmitted by the display module 200 is focused. In addition, the control module 400 and the photographing module 400, which will be described below, are additionally mounted on at least a part of the wearing module 100 to be directly operated by the user or configured to collect the image I or information from the outside.

In the embodiment, the wearing module 100 is formed in the form of glasses, is disposed in a transparent form in the user's field of view with a lens formed in the front and may be selectively worn by the user. In addition, an operation unit 310 operated by the user may be provided on the side part.

Meanwhile, the control module 400 is connected to the display module 200 to selectively adjust the output of the image I or to control the size and position of the image I. Specifically, the control module 400 is a configuration for controlling whether the display module 200 is operated in the optical device of the present invention, and is provided in the control module 400 and configured so that at least a part is exposed to the outside to be operated by the user.

At this time, the control module 400 largely includes an operation unit 310, a recording unit (not illustrated), a control unit (not illustrated) and a battery, and the user selectively outputs the image I recorded in the recording unit by the operation unit 310. Here, the control unit controls the operation of the display module 200 to selectively output the image I stored in the recording unit, or to adjust the size or position of the output image I.

In the present invention, the display module 200 is a configuration that transmits and displays the image I to a lens provided in the wearing module 100, and outputs the image I in a range deviating from the user's central field of view by a predetermined angle. In addition, the control module 400 controls the display module 200 to adjust the output position of the image I by a predetermined angle based on the central field of view or adjust the size.

As such, the control module 400 is provided in the wearing module 100 to control the control unit through the operation unit 310 to adjust whether or not to output the image I and the output position, and the recording unit stores the image I so as to be selectively output.

Meanwhile, the display module 200 is provided in the wearing module 100 to transmit a preset image I or an image I transmitted from the outside to the user's field of view and is connected to the lens in the wearing module 100 to selectively transmit the image I. At this time, the display module 200 provides the image I in a state deviating from the user's central field of view by a predetermined angle so as not to interfere with the user's field of view.

Here, the display module 200 according to the present invention largely includes an output unit 210, a lens unit 220 and a guide unit 230, and the image I output from the output unit 210 is transmitted to the lens provided in the wearing module 100 through the guide unit 230 via the lens unit 220.

In more detail, the display module 200 according to the present invention transmits the image I output from the output unit 210 of the user to the user's field of view via the lens unit 220 and the guide unit 230 to the user, and at this time, is configured to be disposed in a form deviating from the user's central field of view by a predetermined angle.

Figure 3:
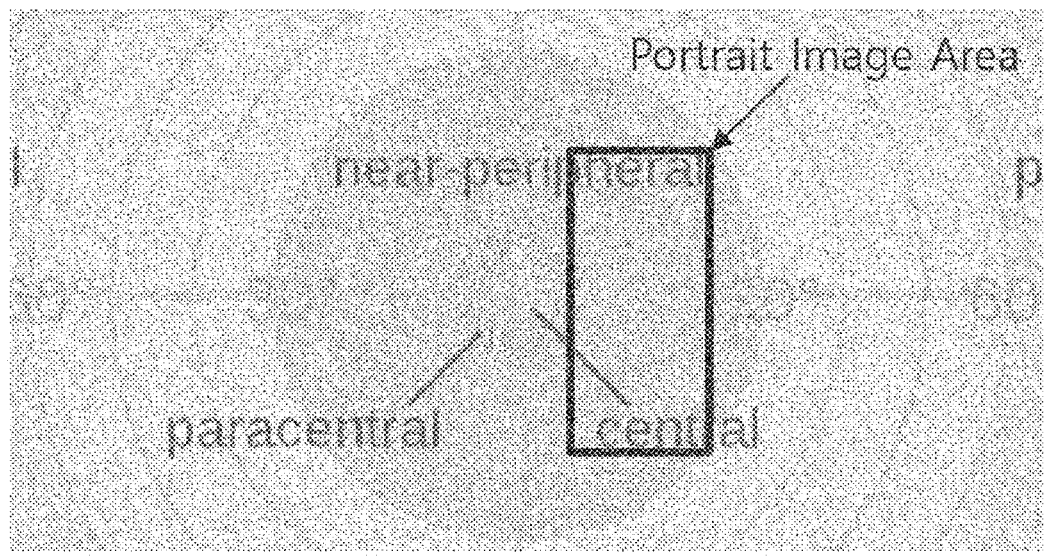
FIG. 3 is a diagram illustrating a state in which an image is disposed at a position out of a central field of view of a user in the optical device of FIG. 1.
Figure 4:
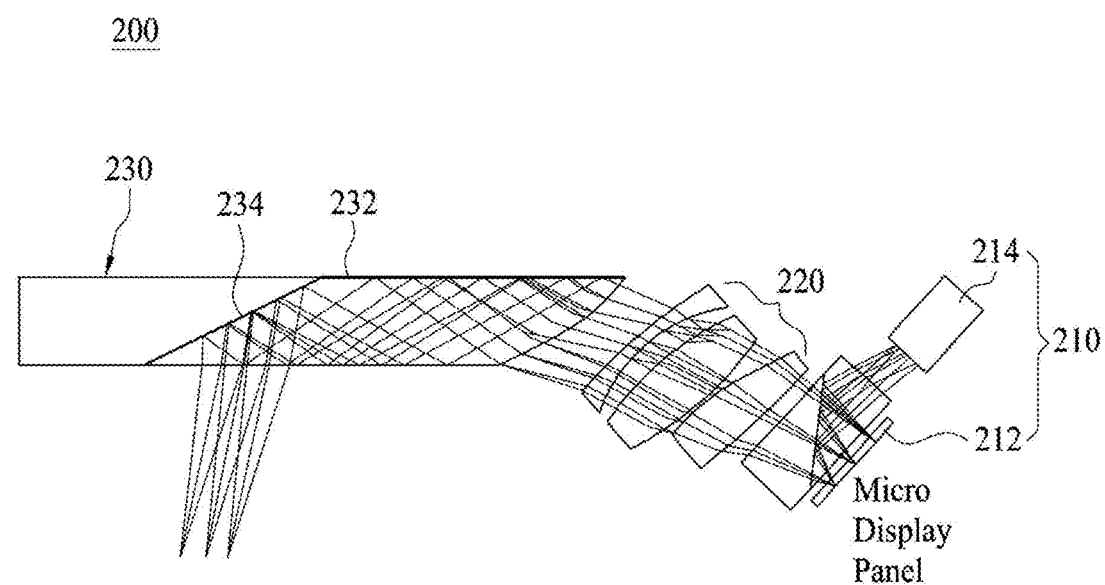
FIG. 4 is a diagram illustrating a state in which an image is transmitted through a display module in a display module capable of positioning an image according to the present invention.
Figure 5:
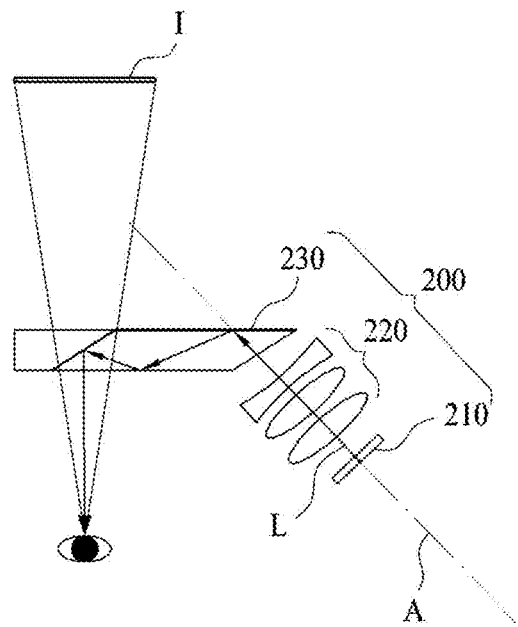
FIG. 5 is a diagram illustrating a state in which an image is output from a central field of view of a user in the display module according to the present invention.
Figure 6:
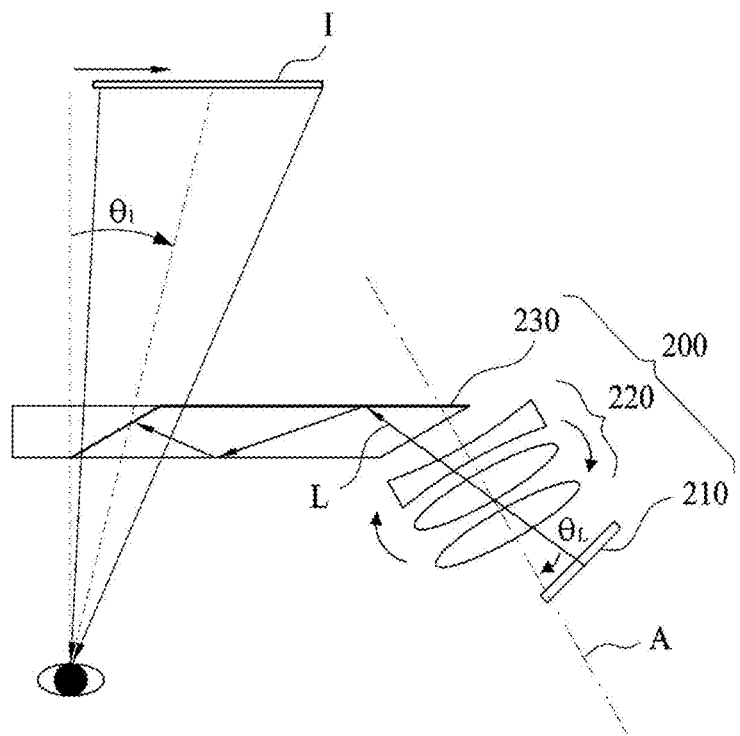
FIG. 6 is a diagram illustrating a state in which the image output from the display module of FIG. 5 is shifted from the central field of view by a predetermined angle.

In general, a portion corresponding to about 5° to 8° from the center of the field of view is the central field of view and has the highest density of receptors to show a clear image, and as a result, when working, a working object is checked through this central field of view and the work proceeds. In addition, a portion corresponding to a range of about 30° from the center of the field of view is a range in which pupil movement is comfortable and corresponds to an area as illustrated in FIG. 3 when the corresponding range is displayed as a viewing angle.

Accordingly, the display module 200 according to the present invention is configured so that the image I is disposed in an area within 5° to 30° that deviates from the user's central field of view and simultaneously allows the user's pupils to move comfortably.

Accordingly, in the display module 200 according to the present invention, through the configuration and arrangement of the output unit 210, the lens unit 220 and the guide unit 230 described above, the image I is positioned within 5° to 30° out of the user's central field of view.

The output unit 210 is configured to output the image I provided in the recording unit forward, and used with a DLP, an LCOS, or the like using a liquid crystal display (LCD) or a micro-mirror and receives the illumination light from a separate light source 214 to output the image I forward. At this time, the output unit 210 transmits or reflects the illumination light transmitted from the outside to output the image I.

Specifically, the output unit 210 may be configured in various forms, and in the present invention, receives the illumination light and outputs the image I forward using the received illumination light. Here, the output unit 210 outputs the image I forward through a separate image unit 214 with the illumination light transmitted from the light source.

Unlike the present embodiment, the output unit 210 may also be configured to transmit the illumination light without outputting the image I by reflecting the illumination light and to output the image I forward. In particular, when the output unit 210 is formed of a transmissive LCD or the like, the illumination light is required, and the output unit 210 may output the image I forward by receiving the illumination light from the guide unit 230 to be described below.

As such, the output unit 210 may receive the illumination light and reflect or transmit it, thereby outputting the image I forward and transmitting it to the lens unit 220 to be described below.

Here, the output unit 210 forms the image I in a rectangular shape so that the image I is disposed in an area out of the user's central field of view and may utilize the widest possible area within a limited area to allow a long side to be disposed along a vertical direction.

This is to arrange the image I so that the user may confirm as much information as possible at a position out of the central field of view while not interfering with the actual field of view during working.

That is, according to the present invention, the output unit 210 forms the image I in a longitudinal rectangular shape and may position the image in an area of about 5° to 30° based on the central field of view.

Meanwhile, the lens unit 220 is disposed in front of the output unit 210 and transmits the output image I and transmits the image I to the guide unit 230 to be described below so that the user may recognize the image I.

The lens unit 220 is configured to diffuse and refract the image I output from the output unit 210 so as to be recognized by the user, and in the present invention, a plurality of lenses may be continuously disposed and at least some of the lenses may be selectively tilted to correct distortion that occurs when the image I is transmitted.

Specifically, the lens unit 220 is made of a light-transmitting material and is disposed on the transmission path of the image I output from the output unit 210 to refract and diffuse the image I and transmit the image I forward. At this time, at least one or more lens units 220 may be continuously disposed so that the user may correctly recognize the image I output from the output unit 210, and the shape thereof may also be variously configured.

Here, the lens unit 220 has a virtual central axis A in front of the output unit 210, and transmits the image I so that an optical axis L of the image I transmitted from the output unit 210 is parallel with the central axis A to transmit the image I forward.

At this time, the image I output from the output unit 210 is provided to deviate from the user's central field of view by a predetermined angle, and the lens unit 220 is tilted at a predetermined angle so that the image I intersects the central axis A corresponding to the angle out of the central field of view to correct the distortion.

In more detail, a plurality of lens units 220 are disposed with respect to the central axis A as described above, and at least some of the lens units 220 are tilted to intersect the central axis A to transmit the image I moving along the optical axis L parallel with the central axis A. Here, in the lens unit 220, a plurality of lenses is continuously disposed along a predetermined central axis A, and each center is located on the central axis A. In addition, the image I output from the output unit 210 has an optical axis L parallel to the central axis A, and the image I is transmitted along the optical axis L.

In the present invention, in the lens unit 220, as illustrated in the drawing, a plurality of lenses are disposed along the central axis A, and some of the lenses are tilted at a predetermined angle so as to intersect the central axis A to correct the distortion.

Specifically, the output unit 210 is disposed at a position deviating from the user's central field of view by a predetermined angle when the image I is transmitted to the user's central field of view, and the lens unit 220 is tilted at a predetermined angle in response to the distortion caused as the image I is disposed out of the user's central field of view to correct the distortion.

At this time, in the present invention, in order to transmit the image I to deviate from the user's central field of view, the optical axis L of the image I emitted from the output unit 210 is parallel with the central axis A and offset to be deflected out of a predetermined distance, or adjust a reflection angle of an exit surface 234 of the guide unit 230 to be described below.

In the embodiment, the image I is configured so that the angle of the exit surface 234 is adjusted so that the image I transmitted to the user's field of view deviates from the user's central field of view. That is, an angle of view of the image I may be adjusted by adjusting the angle of the exit surface 234, and the lens unit 220 corrects the distortion caused by the change of the angle of view of the image I in conjunction with this.

As such, the lens unit 220 is disposed to have the central axis A tilted by intersecting the optical axis L with respect to the image I transmitted to deviate from the user's central field of view by a predetermined angle by the guide unit 230 or the output unit 210 to correct the distortion.

Here, the lens unit 220 is disposed to be tilted by an angle of $\theta\_L$ with respect to the central axis A within the range of $|\theta\_I - \theta\_L| \leq 5°$ to correct the distortion of the image I deviating from the user's central field of view by an angle of $\theta\_I$.

Accordingly, when the image I is implemented by moving from the central field of view by $\theta\_I$, the image is tilted with respect to the central axis A within a predetermined range in response thereto.

Accordingly, the lens unit 220 according to the present invention is tilted at a predetermined angle with respect to the central axis A in response to the angle at which the image I is shifted from the user's central field of view to transmit the image I so as to correct the distortion of the image I.

Meanwhile, the guide unit 230 is configured to transmit the image I to the output unit 210, and has a transmission path formed therein and is formed to be elongated in a predetermined length.

Specifically, the guide unit 230 is formed to be elongated and has a pair of total reflection surfaces 232 disposed to face each other, and a transmission path on which the image I moves in a longitudinal direction is formed between the total reflection surfaces 232.

At this time, at least one pair of total reflection surfaces 232 is configured to be spaced apart from each other with a predetermined separation distance, and the image I transmitted from one side is transmitted to the other side while repeating reflection along the transmission path. Here, one side of the guide unit 230 in the longitudinal direction is disposed at the rear end of the lens unit 220 so that the image I is incident, and the other side thereof includes a separate exit surface 234 to transmit the image I to the user's field of view.

In the present invention, the guide unit 230 is filled with a light-transmitting material having a relatively higher refractive index than external air to form the transmission path, and is configured to have a plurality of total reflection surfaces 232, so that the image I is transmitted along the longitudinal direction through total internal reflection at least once. In addition, at least one of the total reflection surfaces 232 is disposed on a path along which the image I moves so as to be reflected or refracted.

In general, in order to cause the total reflection, the image I is transmitted from a dense medium to a coarse medium, and needs to be incident on the total reflection surface 232 at an angle greater than a critical angle. Accordingly, as in the present invention, when the guide unit 230 is made of a light-transmitting material, the transmission path is filled with a relatively higher density than the outside, and in the embodiment, the transmission path is filled with the same material as the total reflection surface 232.

That is, the guide unit 230 is integrally formed of a material such as glass or synthetic resin, and a pair of total reflection surfaces 232 facing each other is formed.

The image I is incident therein through one side of the guide unit 230 configured as described above to be total-reflected along the transmission path and is transmitted to the other side, and the image I transmitted along the transmission path from the other side is transmitted to the user's field of view through the exit surface 234.

At this time, by adjusting a reflection angle of the exit surface 234, the image I transmitted to the user's field of view may also be positioned by deviating from the central field of view by a predetermined angle.

In the embodiment, the guide unit 230 has a rectangular cross-sectional shape, and the total reflection surface 232 is formed therein. Alternatively, the guide unit 230 may be configured to have various cross-sectional shapes such as a circle, a polygon, and the like.

Accordingly, as illustrated in the drawing, the image I moving along the guide unit 230 is transmitted to the output unit 210 by the total reflection surface 232, and the output unit 210 selectively reflects a part of the image I and outputs the image I forward.

As such, the guide unit 230 is configured to transmit the image I to the user's field of view via the lens unit 220, and adjusts the reflection angle of the exit surface 234 to adjust an angle of view so that the image I deviates from the user's central field of view.

Meanwhile, the optical device according to the present invention may further include a separate photographing module 400.

The photographing module 400 is provided in the wearing module 100 and disposed toward the front so as to photograph the range of the user's field of view, and selectively photographs a video or image I to record the video or image I and transmit the video or image I to the control module 400.

Specifically, the photographing module 400 is configured to include at least one or more cameras and is disposed to face the front of the user in the wearing module 100, and selectively records the front image I. At this time, the photographing module 400 is controlled by the control module 400, and the photographed image I may be stored in the recording unit or transmitted to a separate external device.

In the embodiment, the photographing module 400 is disposed to be deflected from one side of the wearing module 100 and photographs the front image I at a position adjacent to the display module 200. At this time, at least one or more photographing modules 400 are configured and may each independently operate, and may further include a separate lighting unit (not illustrated).

As such, the photographing module 400 selectively photographs the image I in front of the user's field of view to record the image I in the control module 400 and output the image I through the display module 200 later.

As described above, the preferred embodiments of the present invention have been described, and the present invention can be embodied in other forms without departing from the spirit or scope of the present invention in addition to the aforementioned embodiment. Therefore, the embodiment is not limited to a specific form but should be considered to be illustrative, and as a result, the present invention is not limited to the above description and may be modified within the scope of the appended claims and a range equivalent thereto.

EXPLANATION OF REFERENCE NUMERALS AND SYMBOLS

100: Wearing module
200: Display module
210: Output unit
212: Tilting mirror
220: Lens unit
230: Guide unit
232: Total reflection surface
234: Exit surface
300: Control module
310: Operation unit
400: Photographing module
I: Image
A: Central axis
L: Optical axis

The invention claimed is:

1. A display module comprising:
an output unit configured to form an image to output the image forward;
a lens unit configured to have a virtual central axis in front of the output unit and transmit the image so that an optical axis of the image transmitted from the output unit is parallel with the central axis to transmit the image forward; and
a guide unit formed to be elongated to have at least a pair of total reflection surfaces facing each other and of which the image transmitted through the lens unit is incident on one side to move to the other side through total internal reflection at least one or more times and the image is reflected on the other side through a separate exit surface to be provided to the user's field of view, wherein the image output from the output unit is provided to deviate from the user's central field of view by a predetermined angle and the lens unit is tilted at a predetermined angle so that the image intersects the central axis in response to the angle deviating from the user's central field of view to correct the distortion.

2. The display module of claim 1, wherein in the lens unit, a plurality of lenses is disposed along a virtual central axis, and at least some of the lenses are adjusted to intersect the optical axis.

3. The display module of claim 1, wherein the lens unit is disposed to be tilted by an angle of $\theta\_L$ with respect to the central axis within the range of $|\theta\_I - \theta\_L| \leq 5°$ to correct the distortion of the image deviating from the user's central field of view by an angle of $\theta\_I$.

4. The display module of claim 1, wherein the output unit outputs the image so that the optical axis of the image is located at a position parallel to the central axis and deflected to one side.

5. The display module of claim 1, wherein the guide unit is provided in a state in which the image moved inside is out of the user's central field of view by adjusting a reflection angle to a predetermined angle from the exit surface.

6. The display module of claim 1, wherein the output unit selectively reflects at least a part of the incident illumination light and forms an image and transmit the image forward.

7. The display module of claim 1, wherein the output unit forms the image in a rectangular shape and has a long side disposed in a vertical direction.

8. The display module of claim 7, wherein the image is disposed at a position within 5° to 30° along a lateral direction with respect to the user's central field of view.

9. An optical device comprising:
a wearing module that is wearable on a user's head and is at least partially disposed in front of a user's field of view;
a display module provided in the wearing module and according to claim 1; and
a control module connected to the display module to selectively adjust the output of the image or to control the size and position of the image.

10. The optical device of claim 9, further comprising:
a photographing module which is provided in the wearing module to be disposed toward the front to photograph a range of the user's field of view and selectively photographs a video or image to record the video or image and transmit the video or image to the control module.

* * * * *